United States Patent [19]

Kohyama et al.

[11] Patent Number: 4,725,860

[45] Date of Patent: Feb. 16, 1988

[54] INK CARRIER FILM IN USE WITH INK JET RECORDING DEVICE

[75] Inventors: Mitsuaki Kohyama, Higashikurume; Yasuo Hosaka, Tokyo; Tadayoshi Ohno, Kawasaki; Yuuji Suzuki, Yokohama, all of Japan

[73] Assignee: Kabushiki Kaisha Toshiba, Kawasaki, Japan

[21] Appl. No.: 865,631

[22] Filed: May 14, 1986

Related U.S. Application Data

[63] Continuation-in-part of Ser. No. 832,879, Feb. 26, 1986, abandoned.

[30] Foreign Application Priority Data

Feb. 28, 1985 [JP] Japan ........ 60-37510

[51] Int. Cl.[4] ........ G01D 15/16

[52] U.S. Cl. ........ 346/140 R; 400/126; 400/202.2; 400/241.2

[58] Field of Search ........ 346/140, 76 PH, 21; 400/120, 126, 197, 202.2, 202.3, 244.2

[56] References Cited

U.S. PATENT DOCUMENTS

| | | | |
|---|---|---|---|
| 3,655,379 | 4/1972 | Gundlach | 346/140 X |
| 3,834,301 | 9/1974 | Croquelois | 400/126 X |
| 4,603,986 | 8/1986 | Simpson | 400/241.2 |
| 4,608,577 | 8/1986 | Hori | 346/140 |
| 4,630,075 | 12/1986 | Hori | 346/140 |
| 4,652,893 | 3/1987 | Suzuki | 346/140 |

FOREIGN PATENT DOCUMENTS 60-71260 4/1985 Japan .

OTHER PUBLICATIONS

Office action from German Patent Office in P 36 06 659.1 dated 4/21/87 and English translation thereof.

*Primary Examiner*—Joseph W. Hartary
*Attorney, Agent, or Firm*—Finnegan, Henderson, Farabow, Garrett & Dunner

[57] ABSTRACT

An ink jet recording device in which an ink carrier film is formed to have a plurality of pores or recesses, the pores or recesses are filled with ink, the film filled at their pores or recesses with the ink is quickly heated by such a heat supply source as a thermal head according to picture image information to generate bubbles within the ink in the heated pores or recesses and to eject the ink onto a recording medium under influence of the pressure of the bubbles for recording. The ink carrier film comprises at least two layers one of which on a side of the heat supply source is made of a heat-insulating, low-friction material, thus improving the thermal efficiency of the ink carrier film and minimizing the frictional wear of the heat supply source.

21 Claims, 25 Drawing Figures

INK CARRIER FILM IN USE WITH INK JET RECORDING DEVICE

This application is a contnuation-in-part, of application Ser. No. 832,879, filed Feb. 26, 1986, now abandoned.

BACKGROUND OF THE INVENTION

1. Field of the Invention

The present invention relates to an ink jet recording device in which an ink carrier film is formed to have a plurality of pores or recesses, the pores or recesses are filled with ink, the film filled at their pores or recesses with the ink is quickly heated by such a heat supply source as a thermal head according to picture image information to generate bubbles within the ink in the heated pores or recesses and to eject the ink onto a recording medium under influence of the pressure of the bubbles for recording, and more specifically, to an improvement in the structure of an ink carrier film in use with such an ink jet recording device, which enables improvement of its thermal efficiency and minimization of frictional wear of a heat supply source.

2. Description of the Prior Art

Conventionally, there have been proposed various recording systems ranging from impact types to non-impact types. Non-impact type systems, which provide less noise than the impact type systems, include electrophotographic, electrostatic, thermal and ink jet systems. Among non-impact type systems, the ink jet recording system is highly excellent in that it has many advantages of less noise, low power consumption, easy miniaturization, easy modification to colour arrangement and inexpensive constituent elements. According to the ink jet system, in general, very small ink drops are ejected from capillary tube nozzles for printing on a recording paper. There have been proposed an ink jet system (Japanese Patent Appln. Laid-Open Publication No. 48-9622) wherein the vibration of a piezoelectric element within an ink chamber is utilized to instantaneously boost the pressure of the ink liquid and to eject the ink from nozzles, and an ink jet system (Japanese Patent Publication No. 56-9429) wherein heating elements are provided within an ink chamber to generate bubbles in the ink chamber and boost the pressure of the ink liquid for ejection of the ink from nozzles. These systems are called "on-demand" systems which allow ink ejection only when ink is required and ar advantageous in its less ink consumption and relatively high recording speed. The on-demand system, on the other hand, has big problems that manufacturing of the recording head is complicated including the formation of pores in the nozzles and disposition of the piezo-electric elements and heating elements within the ink chamber, and that the stoppage of the system causes solidification of ink liquid and thus the clogging of the nozzle pores, resulting in its operation failure. As a recording system of ejecting ink without using such nozzles, there has been suggested in Japanese Patent Appln. Laid-Open Publication No. 51-132036 a system in which abrupt heating of ink by heating elements provided in the ink liquid causes generation of air bubbles and the bursting impulse of the air bubbles causes ejection of ink drops from the liquid surface. This system can resolve essentially the clogged-ink problem, but has been unsatisfactory in that the evaporation of ink involves environmental pollution problems and many restrictions on the system arrangement, ink leakage occurs during transportation or shift of the system from one place to another, and ink drops tends to become an unstable state because it is difficult to keep constant a distance between the ink surface and the heating section thus lowering the recorded picture quality. As another system without using nozzles, there has been proposed a system such as disclosed in Japanese Patent Application No. 58-178201, in which as an ink carrier film having a plurality of pores or recesses formed therein is passed through an ink supply section, the pores or recesses are filled with ink so that when the ink-filled pores or recesses reach the surface of a thermal head, a voltage is applied to the thermal head to quickly heat them and generate bubbles in them, whereby the pressure of the generated bubbles causes ejection of the ink in the pores or recesses toward a recording paper for recording. However, this proposal involves such a problem that the ink carrier film used in the system is usually made of metal, thus causing a low thermal efficiency and fast frictional wear of the thermal head.

In view of the above circumstances, it is an object of the present invention to provide an improvement in the structure of an ink carrier film with an improved thermal efficiency and a less frictional wear of such a heat supply source as a thermal head.

SUMMARY OF THE INVENTION

In accordance with the present invention, the above object is attained by providing an ink jet recording device in which an ink carrier film is formed to have a plurality of pores or recesses, the pores or recesses of the film are filled with ink at an ink supply section, the ink-filled film is moved from the ink suppl section to a heat supply source such as a thermal head so that when the film reaches the heat supply source, driving of the heat supply source according to picture image information causes bubbles to generate within the ink filled in the pores or recesses and pressures of the bubbles cause the ink in the pores or recesses to be ejected onto a recording medium for recording, and wherein the ink carrier film comprises at least two layers, on of the layers on a side of the heat supply source being made of a material having at least heat insulating property.

The heat-insulating material can also be a low friction material and it may be fluorine-contained polymer such as ethylene trifluoride, ethylene tetrafluoride or ethylene hexafluoride, resin such as polyimide, polypropylene or polyphenylene oxide, ceramic such as $SiO_2$, SiC, SiN or $B_4N_3$, or coating material using such resin as fluoroplastic, polyimide, polypropylene or polyphenylene oxide as a binder resin on which fine powder of graphite, molybdenum disulfide, talc, indium and so forth is dispersed.

With such an arrangement of the present invention, since the ink carrier film comprises at least two layers, one of the layers on the side of the heat supply source being made of a heat-insulating, low-friction material, the thermal efficiency of the ink carrier film can be improved and the energy necessary for heating can be reduced to a large extent. Further, since the frictional wear of the heat supply sourc is also reduced, the heat supply source can be of long operation life. In addition, the heat-insulating, low-friction material is soft and thus a tight sealing between the film and the heat supply source can be realized and the ink ejecting force can be increased.

BRIEF DESCRIPTION OF THE DRAWINGS

In the accompanying drawings:

FIG. 8(*b*) is a magnified perspective view of a recording section of the monochromatic serial printer of FIG. 8(*a*)

DESCRIPTION OF THE PREFERRED EMBODIMENTS

The present invention will be explained with reference to illustrated embodiments.

Figure 1:
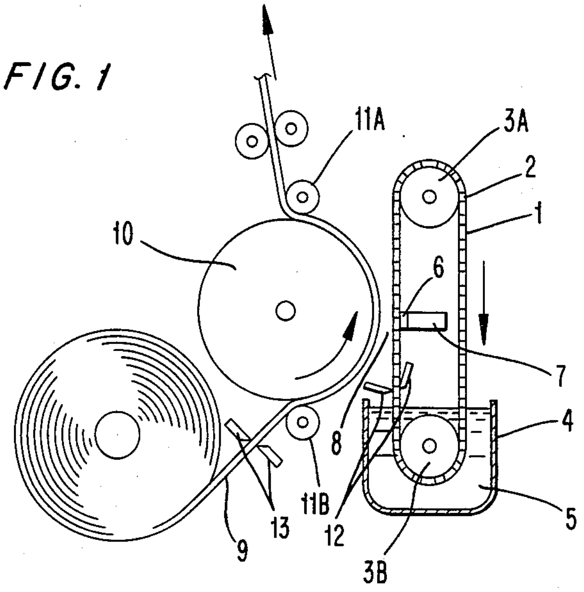
FIG. 1 schematically shows a basic arrangement of an ink jet recording device which uses an ink carrier film in accordance with the present invention.

Referring to FIG. 1, there is shown a basic arrangement of a major part of an ink jet device which uses an ink carrier film in accordance with the present invention, in which a film 1 is of an endless belt type having a plurality of pores 2 as will be detailed later. The diameter of the pore 2 is determined by the thickness of the film so that when the film has a thickness of about 50 μm, the pore has a maximum diameter of about 50 μm. As rollers 3A and 3B rotate, the film 1 is moved in a direction shown by an arrow. As the film 1 is passed through an ink supply section 4, the pores 2 of the film 1 are filled with recording ink 5. The ink filled in the pores is conveyed by rotary advancement of the film 1 to a position (in a recording section 8) at which heating elements 6 comprised of a thermal head 7 are arranged in a row in front of the ink so that heating of the heating elements 6 causes sequential ejection and transfer of the ink of the pores 2 to a recording paper (sheet to be recorded) 9. The thermal head 7 includes a driver circuit which selectively heats the heating elements 6. I the illustrated embodiment, the recording paper 9, which is supported by a platen roller 10 and rollers 11*a* and 11*b* for prevention of paper feed slippage, is opposed to the recording section 8 as spaced therefrom by a gap of between 0.1 and 0.5 mm. A blade 12 is provided to scrape off unnecessary ink attached onto the film 1 after passage of the film through the ink supply section 4. A cutter 13 is used to cut the rolled paper into a desired length. In such a monochromatic line printer arranged as mentioned above, recording operation is effected by selectively applying a voltage to the plurality of heating elements 6 arrange in line.

Figure 2:
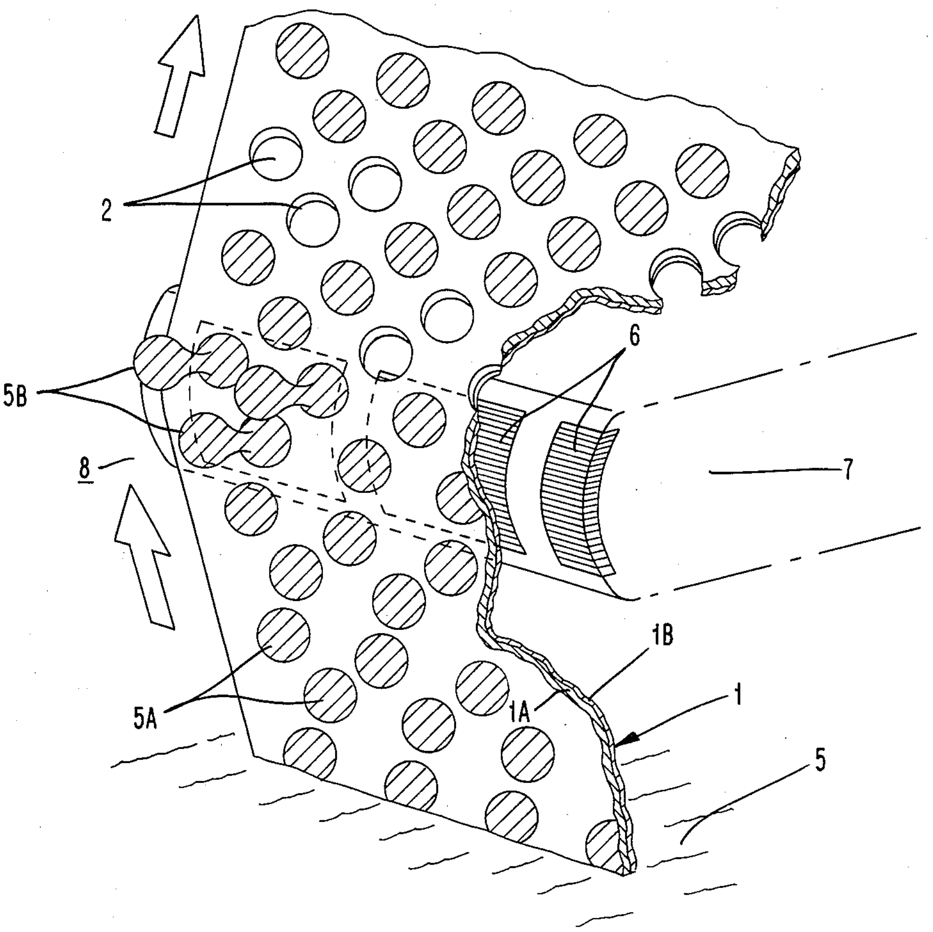
FIG. 2 is a magnified perspective view of a part of the ink jet recording device shown in FIG. 1.
Figure 3A:
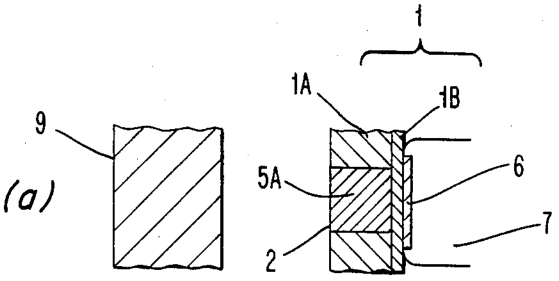
FIG. 3(*a*)-(*f*) shows ink ejecting steps, in section, of the ink carrier film of the present invention.
Figure 3B:
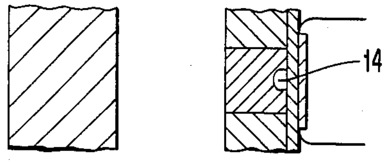
Figure 3C:
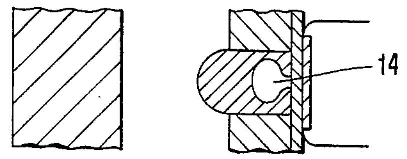
Figure 3D:
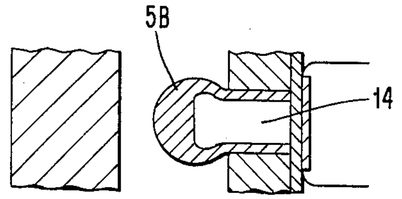
Figure 3E:
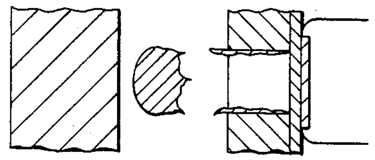
Figure 3F:
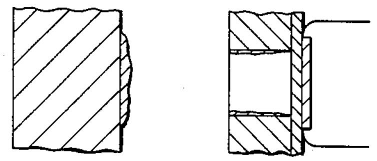

FIG. 2 is a magnified perspective view of the recording section 8 in FIG. 1. The film 1 having a total thickness of 10 to 60 μm is provided with the pores 2 which have a diameter of 15 to 60 μm. The recording ink 5 filled in the pores 2 forms an ink layer 5A which has substantially the same thickness as the film 1. When the ink layers 5A come into contact with heating parts of the heating elements 6 of the thermal head 7, heat from the heating parts causes air bubbles to be generated within the ink layers 5A so that the bubble formation pressure enables ejection and transfer of ink drops 5B onto the recording paper through the pores 2 acting as nozzles.

FIGS. 3(*a*) to (*f*) schematically show ink ejecting steps, in which (a) is a state in which the heating element 6 of the thermal head 7 is not heated yet and thus the ink layer 5A within the pore 2 is not changed yet, (b) is a state in which the element 6 starts to heat, and when it reaches 150°-200° C., an air bubble 14 generates in part of the ink layer 5A contacted with the heating part of the element, (c) is a state in which the air bubble 14 abruptly expands, (d) is a state in which the ink drop 5B is formed, (e) is a state in which the ink drop 5B is ejected toward the recording paper, and (f) is a state in which the ink drop collides against the recording paper 9 and is absorbed thereinto.

The ink carrier film 1 of a two-layer structure used in such an ink jet device which, as shown in FIGS. 2 and 3, comprises a film layer 1A of 8 to 50 μm thickness made of such metal as nickel or stainless steel, and a thermal insulating material layer lB coated, vacuum evaporated or bonded on the metallic film layer 1A with a thickness of 2 to 20 μm, the layer lB being made of such fluorine-contained polymer as ethylene trifluoride, ethylene tetrafluoride or ethylene hexafluoride, such excellent heat-resistant or lubricating resin as polyimide, polypropylene, or polyphenylene oxide, or such ceramic as $SiO_2$, SiC, SiN or $B_4N_3$.

In the above heating steps, the heat insulating material layer 1B functions to restrain transmission of heat from the heating element 6 to the film 1, contributing to power saving.

Figure 4:
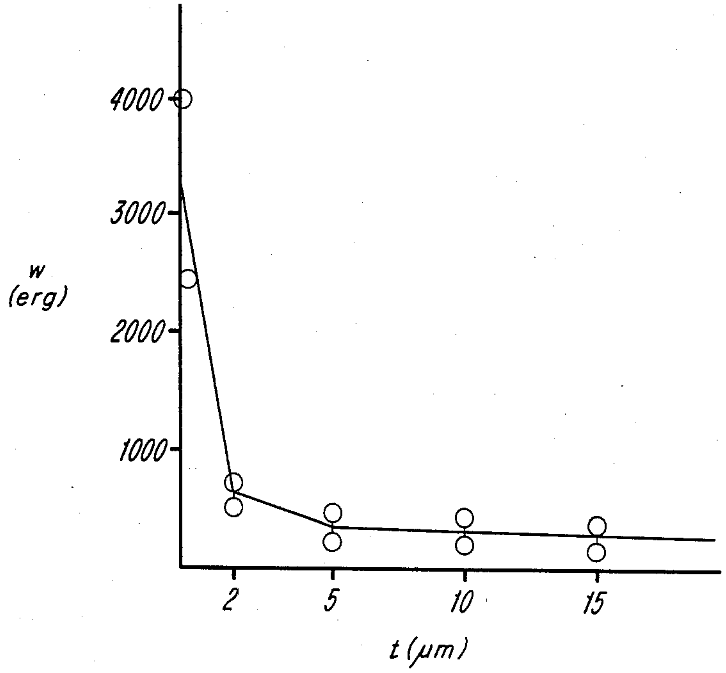
FIG. 4 is a graph showing a relation between the thickness of heat insulating material and the necessary energy.

FIG. 4 shows relation between the thickness t of the heat insulating material layer lB (ethylene trifluoride) and the energy W necessary to eject the ink. It will be seen from FIG. 4 that the required energy W abruptly decreases at the thickness t of 2 μm or more. In an experiment by the inventors, comparison was made between a nickel film of 15 μm thickness and a two-layer film of the nickel film coated with ethylene trifluoride to a thickness of about 5 μm. The latter required about 1/10 or less of the power required by the former.

With such an arrangement, provision of a soft heat-insulating material layer lB in a gap between the metallic film lA and the thermal head 7 enables an improved tight seal therebetween, which prevents the pressure of the air bubble 14 generated within the ink from escaping from a gap between the film 1 and the thermal head 7, thus keeping the ejecting force of the ink drop 5B at its maximum level. As a result, the ink drop ejecting force is increased so that a gap of about 0.1 mm between the film and the recording paper can provide a substantially same quality of printed picture.

Further, this arrangement is advantageous in that a frictional wear between the thermal head 7 and the film 1 is reduced and thus the operation life of the expensive thermal head can be prolonged.

Although the layer lB on the side of the thermal head 7 has been made of a heat insulating material in the foregoing embodiment, the layer lB may be a low frictional material layer made of a resin such as fluorine-contained polymer, polyimide, polypropylene or polyphenylene oxide, or a coating material using one of these resins as a binder,resin on which fine powder of graphite, molybdenum disulfide, talc, and the like is dispersed, or more preferably may be a heat-insulating, low-friction material layer made of such resin as fluorine-contained polymer or polyimide.

Figure 5A:
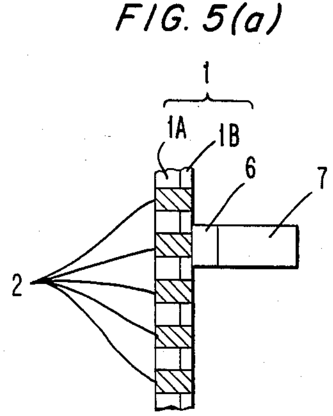
FIGS. 5(*a*) and (*b*) and FIGS. 6(*a*) and (*b*) are diagrams for explaining different positional relations between pores of the ink carrier film and the recording head, respectively.
Figure 5B:
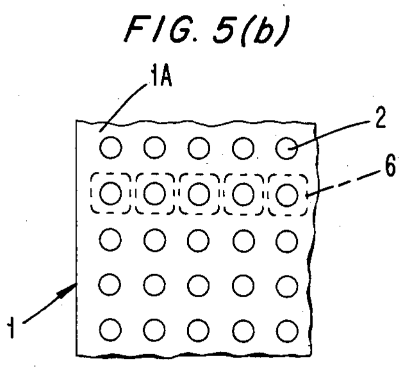
Figure 6A:
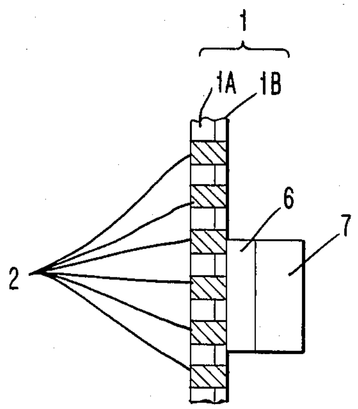
Figure 6B:
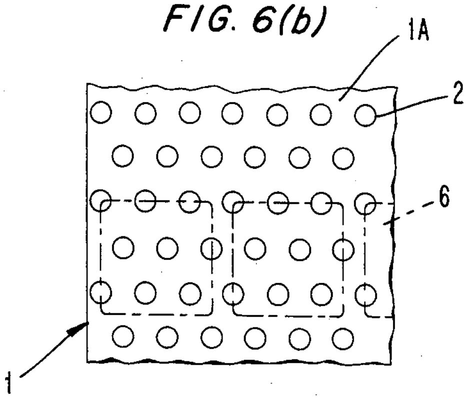

FIGS. 5(*a*) and (*b*) and FIGS. 6(*a*) and (*b*) are diagrams for explaining a positional relation between the thermal head and the pores of the film, respectively. More particularly, FIG. 5 shows a case in which each heating element in the thermal head corresponds to one of the pores 2, while FIG. 6 shows a case in which each heating element corresponds to a plurality of. pores 2. The latter case (FIG. 6) shows higher recording reliability than the former case (FIG. 5) against the occurrence of clogged pores. Further, the latter case does not require the consideration of the positional relation between the thermal head and the nozzle pores. In other words, since at least one of the plural pores is certainly positioned in front of the thermal head, even improper timing will cause no recording failure.

Figure 7:
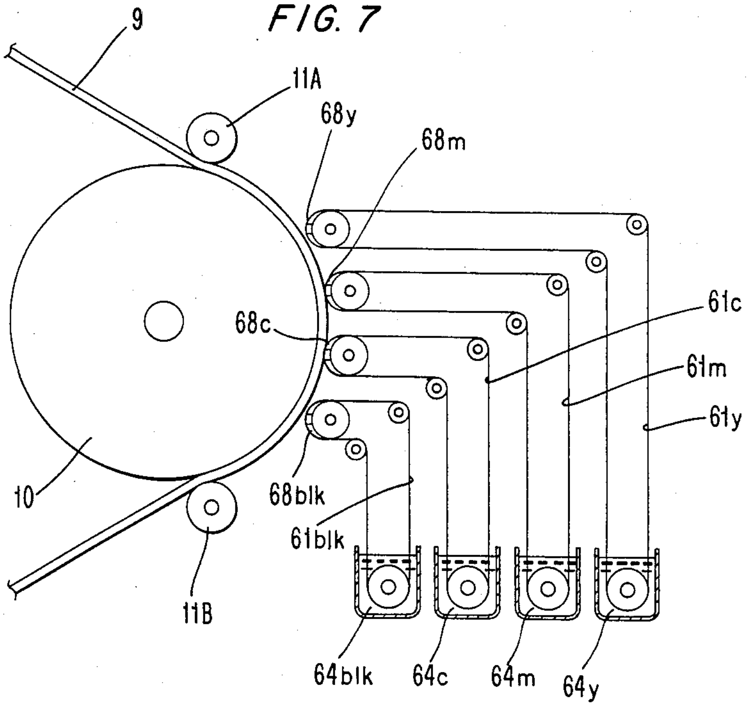
FIG. 7 schematically shows an example of ink jet colour line printer which employs the ink carrier film of the present invention.

FIG. 7 shematically shows an arrangement of an example of ink jet colour line printer which uses the ink carrier film according to the present invention. The basic arrangement of FIG. 7 ar substantially the same as that of the monochromatic line printer shown in FIG. 1 and the basic unit shown in FIG. 1 corresponds to each of primary colours. More specifically, **61*y* and 64*y* represent a yellow (Y) film and an ink supply section therefor, 61*m* and 64*m* a magenta (M) film and an ink supply section therefor, 61*c* and 64*c* a cyanic (C) film and an ink supply section therefor, and 61*blk* and 64*blk* a black (BLK) film and an ink supply section therefor, respectively. Recording sections 68*y*, 68*m*, 68*c* and 68*blk*, which comprise respectively a thermal head and a driver circuit, are provided as opposed to a platen 10 allowing feeding and supporting the recording paper 9. By recording dot pattern in mesh-point or overlapping manners by the Y, M, C and BLK recording sections 68*y*, 68*m*, 68*c* and 68*blk* in synchronism with the feeding operation of the paper 9**, a multi-colour or full-colour recording can be realized.

Figure 8A:
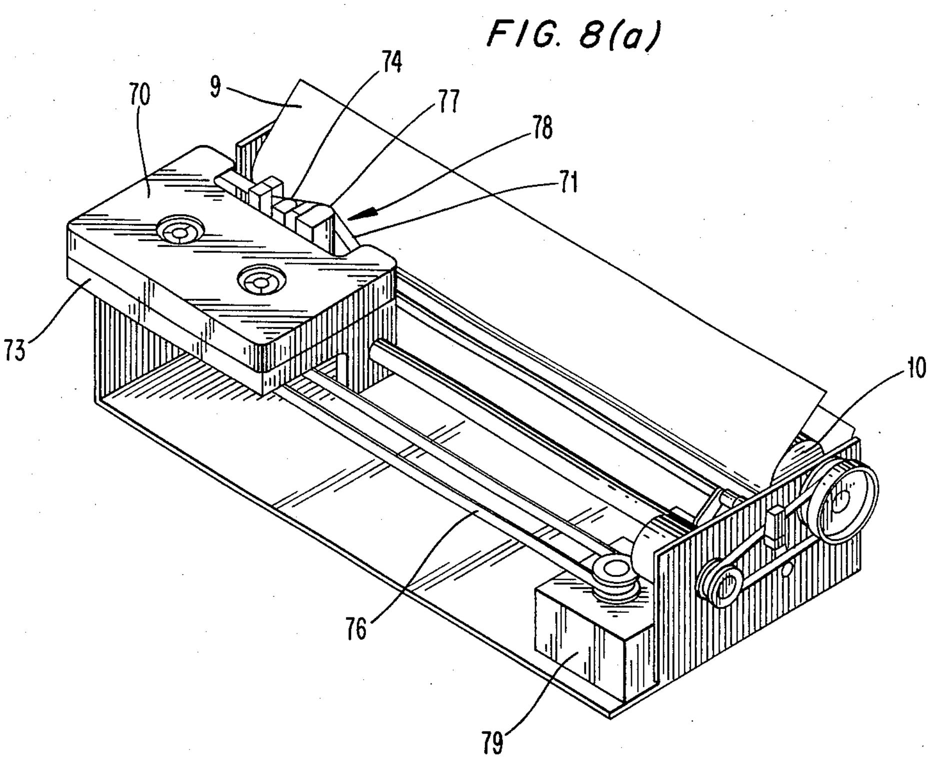
FIG. 8(*a*) is a perspective view showing an example of monochromatic serial printer which uses the ink carrier film of the present invention.
Figure 8B:
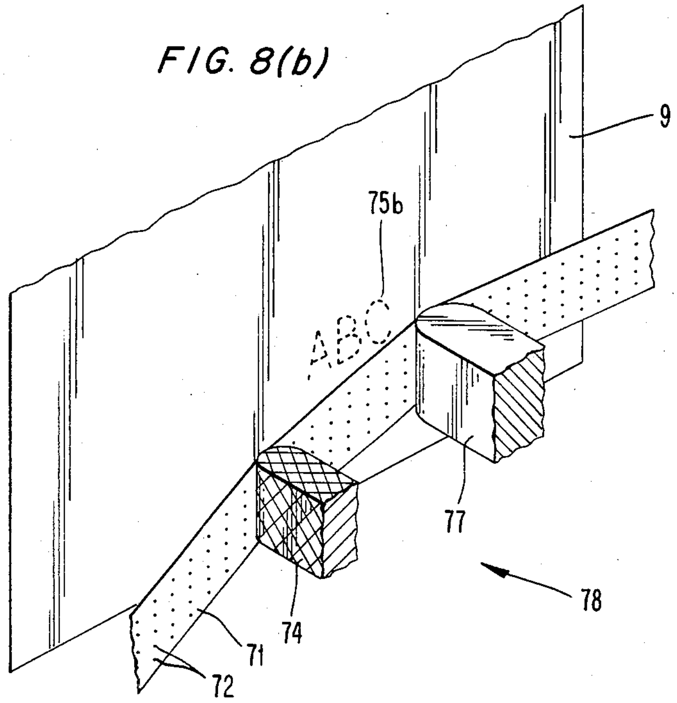
Figure 9A:
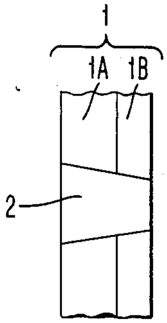
FIG. 9(*a*)-(*h*) shows different forms of pores or recesses, in section, formed in the ink carrier film of the present invention.
Figure 9B:
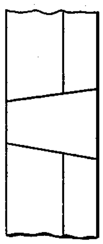
Figure 9C:
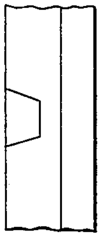
Figure 9D:
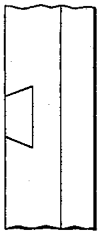
Figure 9E:
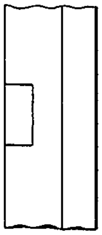
Figure 9F:
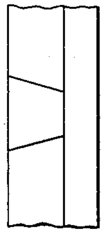
Figure 9G:
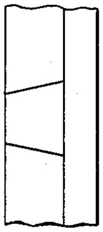
Figure 9H:
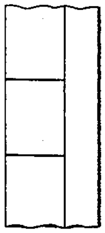

There is shown in FIG. 8 a schematic perspective arrangement of an example of monochromatic serial printer which employs an ink carrier film made in the form of a cassette according to the present invention and which has substantially the same basic arrangement as the monochromatic line printer shown in FIG. 1. More in detail, a film 71 is contained within a cassette 70 together with an ink supply section and so on. The cassette 70, which in turn is mounted on a carriage 73, is moved by a motor 79 through a driving belt 76 in the width direction of the recording paper 9. In a recording section 78 of a printer such as shown in FIG. 8(*b*), ink 75 is supplied from a sponge 74 impregnated with the ink to pores 72 formed in the film 71 so that heating of a thermal head 77 causes ejection of ink drops 75B onto the recording paper 9 for recording. When Y, M, C and BLK cassettes are provided along the width direction of the recording paper in this monochromatic serial printer, it can be used as a colour serial printer.

In this manner, the present invention can be applied to a monochromatic line printer, a monochromatic serial printer, a colour line printer, and a colour serial printer.

The sectional configuration of the pores of the film is parallel as shown in FIG. 3 in the foregoing embodiments. However, it may be tapered as shown in FIG. 9(*a*) and (*b*). Further, the pores are not necessarily formed to pass through the film, but the pore may be a tapered recess as shown in FIGS. 9(*c*), (*d*), (*f*) or (*g*), or may be a parallel recess as shown in FIGS. 9(*e*) or (*h*) The density of the pores or recesses in the film can be suitably determined by the recording density and the density of the heating elements in the thermal head. Since these pores or recesses are used as ink jet nozzles, the clogged nozzle problem can be completely eliminated. In addition, since a plurality of the pores or recesses are formed in the film, the recording density of the present invention can be made much higher than that of the prior art ink jet. Furthermore, since the present invention utilizes the pressure of air bubble, the ink ejecting force can be made larger than that based on such a prior-art piezoelectric element, resulting in an increase of its recording speed.

Although the film has been of a belt type in the foregoing embodiments, it may be of a reciprocating motion type.

In the foregoing embodiments, the thermal head has been used as a heat supply source to generate bubbles within the ink filled in the pores or recesses of the ink carrier film and the plurality of heating elements in the thermal head have been arranged to be selectively heated according to the picture image information. However, for example, a laser unit may be employed as the heat supply source and the laser beam of the laser unit may be arranged to be selectively turned ON or OFF according to picture image information for supply of the thermal energy to the ink carrier film.

Figure 10:
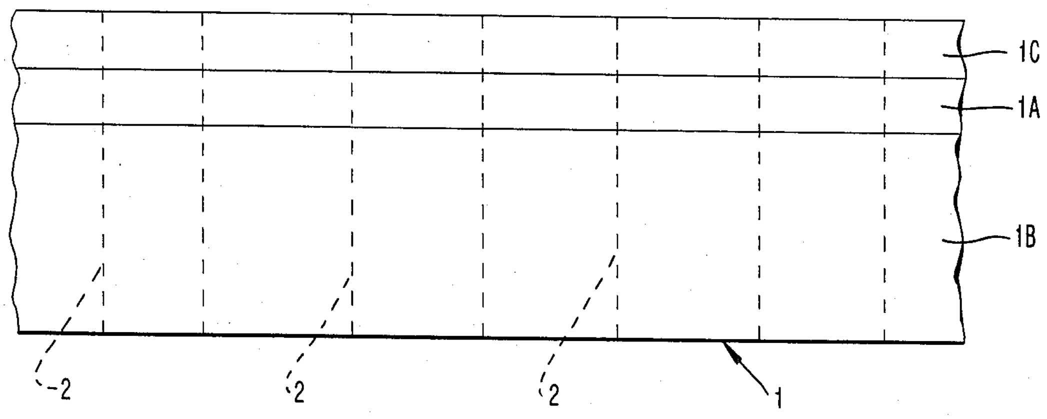
FIG. 10 shows an alternative embodiment of the present invention that has a three layer structure.

In addition, although the ink carrier film 1 has had a two-layer structure in the foregoing embodiments, the film 1 may have a three-layer structure as shown in FIG. 10. The film 1 shown in FIG. 10 comprises a heat insulating layer is positioned on the side of the thermal head 7, a metallic layer 1A and a protective layer IC.

In this embodiment, the heat resistant layer 1B is a polyimide film of 12.5 $\mu$m thick capable of withstanding temperature of above 400° C. This polyimide film has a thermal conductivity of $4\times10^{-4}$ cal/cm.s.deg, which is much smaller than that of metal. For example, it is about 1/500 of that of nickel (Ni) and 1/2400 of that of copper (Cu). Therefore, the thermal conductivity of the th polyimide film is negligible.

The metallic layer 1A is provided on one side of the polyimide film 1B opposite to the thermal head 7, since the film 1B is weak against mechanical force such as tensile force (though the polyimide film has a tensile strength of 17Kg f/mm$^2$ that is rather large compared with other polymers). The metallic layer 1A is provided by coating nickel (Ni) on one side of the polyimide film 1B to a thickness of 5 $\mu$m by a plating process. Since nickel has a tensile strength of 50 Kg f/mm$^2$, that is three times stronger than that of polyimide and is also excellent in dynamic properties when compared with polyimide, the film 1 is improved in strength and stability. In addition, polyimide is highly flexible and hard to break or permanently bend, and thus the film 1 has prolonged operational life and is easy to handle and to form holes by photoetching operations.

Further, the protective layer IC is provided for hydrophobic treatment by coating tetrafluoroethylene (known by the trademark Tefion) thinly on the upper side of the metallic layer 1A. This can prevent exudation of the ink 5 on the side of the film 1 facing the recording paper 9. Further, even if the ink 5 is attached onto the surface of the film 1, the film surface can be completely cleaned by the excessive-ink scraping blade 12 made of a hydrophilic, resilient material.

Furthermore, a siloxane derivative layer of about 3 μm thick for frictional wear resistance is provided on the other side of the film 1 of FIG. 10 facing the thermal head 7 to prevent subjection of the film 1 to frictional wear or scratches thereon during movement of the film 1 on the thermal head 7 in the recording mode. It is of cource desirable that the surface of the thermal head 7 is similarly subjected to frictional-wear resistant processing.

The siloxane derivative may be prepared, for example, by adding a two-functional silicon tetrachloride to predetermined quantitites of monohydric alcohol or the like and ester or the like to obtain colloidal dispersions through partial hydrolytic action.

The siloxane derivative thus obtained is coated on one side of the film and heated and left to stand at a temperture of about 50° C. to 100° C. for several hours to form the frictional-wear resistant film. Our tests have showed that such frictional-wear resistant filmm is not subjected to any scratched damages even when rubbed with steel wool.

This siloxane derivative film is a thin glass material silica which is thermally strong and good in moisture absorption property and hydrophilic nature because it probably contains silanol groups to a small extent in its siloxane network. As a result, the recording ink 5 can be uniformly attached and can be quickly supplied to the heating element 6 by capillary action developed between the element 6 and the head 7, thus properly preventing any shortage in supply of the ink 5.

What is claimed is:

1. An ink carrier film formed with a plurality of pores or recesses for use in an ink jet recording device including an ink supplying means for supplying ink into said pores or recesses, a heat supplying means driven according to picture image information for heating the ink filled with said pores or recesses of said film to generate a bubble in the ink so as to eject the ink onto a recording medium by the air pressure in said bubble, and film conveying means for conveying said film between said ink supplying means and said heat supplying means, said ink carrier film comprising at least two layers, one of said layers which is disposed on the side of said heat supplying means being made of a material having at least heat insulating property.

2. A film as set forth in claim 1, wherein said material has low friction property together with heat insulating property.

3. A film as set forth in claim 1, wherein said heat insulating material is fluorine-contained polymer such as ethylene trifluoride, ethylene tetrafluoride or ethylene hexafluoride polymer.

4. A film as set forth in claim 1, wherein said heat insulating material is polyimide, polypropylene or polyphenylene oxide polymer.

5. A film as set forth in claim 1, wherein said heat insulating material is ceramic made of $SiO_2$, SiC, SiN or $B_4N_3$.

6. A film as set forth in claim 1, wherein said heat insulating material is a coating material using fluorine-contained polymer as a binder resin.

7. A film as set forth in claim 1, wherein said heat insulating material is a coating material using polyimide, polypropylene or polyphenylene oxide polymer as a binder resin.

8. A film as set forth in claim 1, wherein said heat insulating material has a thickness of 2 to 20 μm.

9. A film as set forth in claim 1, wherein other layer of said ink carrier film which is disposed on the side of said recording medium is made of such metal as nickel or stainless steel.

10. A film as set forth in claim 1, wherein said film comprises two layers, one of said layers which is disposed on the side of said recording medium being a nickel film of 15 μm thick and the other which is disposed on a side of said heat supply means being a ethylene trifluoride film of about 5 μm thick.

11. A film as set forth in claim 1, wherein said film comprises two layers, one of said layers which is disposed on the side of said recording medium having a thickness of 8 to 50 μm, said heat insulating material layer having a thickness of 2 to 20 μm and said film having a total thickness of 10 to 60 μm.

12. A film as set forth in claim 1, wherein said ink carrier film is housed in a cassette together with said ink supply means including a sponge impregnated with ink.

13. A film as set forth in claim 1, wherein said heat supply means is a thermal head which comprises a plurality of heating elements to be selectively heated.

14. A film as set forth in claim 12, wherein each of said pores or recesses in said ink carrier film corresponds to one of said heating elements of said thermal head.

15. A film as set forth in claim 12, wherein each of said pores or recesses in said ink carrier film corresponds to a plurality of said heating elements of said thermal head.

16. A film as set forth in claim 1, wherein said pores or recesses of said ink carrier film are made to be square in sectional shape.

17. A film as set forth in claim 1, wherein said pores or recesses of said ink carrier film are made to be tapered in sectional shape.

18. The film as set forth in claim 1, wherein the film has three layers comprising the heat insulating layer, a metallic layer provided on the side of the heat insulating layer opposite to the heat supplying means, and a protective layer on the upper side of the metallic layer.

19. The film as set forth in claim 18, wherein the heat insulating layer is a polyimide film and the metallic layer is a nickel coating.

20. The film as set forth in claim 19, wherein the protective layer is a tetrafluoroethylene coating.

21. The film as set forth in claim 18, further comprising a siloxane derivative layer provided on the side of the heat insulating layer disposed to the heat supplying means.

* * * * *